(12) United States Patent
O'Brien et al.

(10) Patent No.: US 12,423,607 B2
(45) Date of Patent: Sep. 23, 2025

(54) VERIFIED QUANTUM PHASE ESTIMATION

(71) Applicant: Google LLC, Mountain View, CA (US)

(72) Inventors: Thomas Eugene O'Brien, Munich (DE); Ryan Babbush, Venice, CA (US); Nicholas Charles Rubin, San Francisco, CA (US); Jarrod Ryan McClean, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 1058 days.

(21) Appl. No.: 17/464,278

(22) Filed: Sep. 1, 2021

(65) Prior Publication Data

US 2022/0067567 A1 Mar. 3, 2022

Related U.S. Application Data

(60) Provisional application No. 63/073,134, filed on Sep. 1, 2020.

(51) Int. Cl.
*G06N 10/40* (2022.01)
*G06F 5/01* (2006.01)
*G06N 10/60* (2022.01)

(52) U.S. Cl.
CPC ............ *G06N 10/40* (2022.01); *G06F 5/01* (2013.01); *G06N 10/60* (2022.01)

(58) Field of Classification Search
CPC ............ G06N 10/40; G06N 10/60; G06F 5/01
See application file for complete search history.

(56) References Cited

U.S. PATENT DOCUMENTS

2023/0020166 A1\* 1/2023 Elfving ............... G16C 20/30

OTHER PUBLICATIONS

O'Brien et al., Quantum Phase Estimation of Multiple Eigenvalues for Small-Scale (Noisy) Experiments, New J. Phys. 21 (2019) 023022, Feb. 2019. (Year: 2019).\*
Russo et al., Evaluating Energy Differences on a Quantum Computer with Robust Phase Estimation, Jul. 2020. (Year: 2020).\*
Bonet-Monroig et al., Low-Cost Error Mitigation by Symmetry Verification, Jan. 2019. (Year: 2019).\*

(Continued)

*Primary Examiner* — Marshall L Werner
(74) *Attorney, Agent, or Firm* — Fish & Richardson P.C.

(57) ABSTRACT

Methods, systems, and apparatus for verified quantum phase estimation. In one aspect, a method includes repeatedly performing a experiment. Performing one repetition of the experiment includes: applying a second unitary to a system register of N qubits prepared in a target computational basis state; applying, conditioned on a state of a control qubit, a first unitary to the system register; applying an inverse of the second unitary to the system register and measuring each qubit to determine an output state of the system register; measuring the control qubit to obtain a corresponding measurement result m; and post-selecting on the target computational basis state by, in response to determining that the output state indicates that each qubit was in the target computational basis state prior to measurement, incrementing a first or second classical variable by $(-1)^m$. Phases or expectation values of the first unitary are estimated based on the classical variables.

24 Claims, 6 Drawing Sheets

(56) References Cited

OTHER PUBLICATIONS

Office Action in Australian Appln. No. 2021336875, mailed on Aug. 24, 2023, 3 pages.
Office Action in Canada Appln. No. 3,191,400, mailed on Jan. 13, 2025, 6 pages.
PCT International Appln No. PCT/US2021/048710, dated Jan. 21, 2022, 18 pages.
O'Brein et al, "Quantum phase estimation of multiple eigenvalues for small-scale (noisy) experiments" New Journal of Physics, 2019, 28 pages.
International Preliminary Report on Patentability in International Appln No. PCT/US2021/048710, mailed on Mar. 16, 2023, 13 pages.
Notice of Allowance in Australian Appln. No. 2024200550, mailed on Mar. 27, 2025, 3 pages.
Notice of Allowance in Australian Appln. No. 2021336875, mailed on Oct. 24, 2023, 3 pages.
Bonet-Monroig et al., "Low-cost error mitigation by symmetry verification," Phys. Rev. A., Dec. 2018, 98:062339.
Kitaev et al., "Quantum measurements and the Abelian Stabilizer Problem," CoRR, Nov. 1995, arxiv.org/abs/quant-ph/9511026, 22 pages.
Lu et al., "Algorithms for Quantum Simulation at Finite Energies," PRX Quantum, May 2021, 17;2(2):020321.
McArdle et al., "Error-Mitigated Digital Quantum Simulation," Phys. Rev. Lett., May 2019, 122:180501.
McClean et al., "The theory of variational hybrid quantum-classical algorithms," New J. Phys., Feb. 2016, 18:023023.
O'brien et al., "Error mitigation of variational algorithms and expectation value estimation via veried phase estimation,".
O'brien et al., "Initial disclosure ling: post-selected quantum phase estimation,".
O'Brien et al., "Quantum phase estimation of multiple eigenvalues for small-scale (noisy) experiments," New Journal of Physics, Feb. 2019, 21:023022.
Russo et al., "Evaluating energy differences on a quantum computer with robust phase estimation," CoRR, Jul. 2020, arxiv.org/abs/2007.08697, 16 pages.
Temme et al., "Error Mitigation for Short-Depth Quantum Circuits," Phys. Rev. Lett., Nov. 2017, 119:180509.
Zitchenko et al., "Randomized gap and amplitude estimation," Phys. Rev. A., Jun. 2016, 93:062306.

* cited by examiner

VERIFIED QUANTUM PHASE ESTIMATION

CROSS REFERENCE TO RELATED APPLICATION

This application is a non-provisional of and claims priority to U.S. Provisional Patent Application No. 63/073,134, filed on Sep. 1, 2020, the entire contents of which are hereby incorporated by reference.

BACKGROUND

This specification relates to quantum computing.

Quantum phase estimation is a protocol for learning the eigenphases $e^{i\Phi_j}$ of an unitary operator U or, equivalently, for learning the eigenvalues $E_j$ of a Hermitian operator H since such operators generate respective unitary operators via exponentiation $U=e^{iHt}$.

SUMMARY

This specification describes technologies for mitigating errors accumulated during quantum phase estimation routines, referred to herein as verified quantum phase estimation.

In general, one innovative aspect of the subject matter described in this specification can be implemented in a method for quantum phase estimation of a first N-qubit unitary operator on a quantum state, the method including: initializing a first classical variable and a second classical variable; generating a set of measurement data, comprising repeatedly performing a phase estimation experiment, wherein at each repetition a current value of a classical variable is incremented based on a measured outcome of the phase estimation experiment and performing one repetition of the phase estimation experiment comprises: preparing a system register comprising N qubits in the quantum state, comprising applying a second unitary operator to the system register, wherein prior to application of the second unitary operator each qubit in the system register is initialized in a target computational basis state; applying, conditioned on a state of a control qubit, the first unitary operator a number of times to the system register in the quantum state to generate an evolved quantum state, wherein prior to application of the first unitary operator a number of times the control qubit is initialized in a superposition state; applying an inverse of the second unitary operator to the system register in the evolved quantum state and measuring each qubit in the system register to determine an output quantum state of the system register; measuring the control qubit to obtain a corresponding measurement result m; and post-selecting on the target computational basis state, comprising i) in response to determining that the output quantum state indicates that each qubit was in the target computational basis state prior to measurement, incrementing the first or second classical variable by $(-1)^m$; and estimating one or more phases, eigenstate amplitudes or expectation values of the first unitary operator or other operators based on the set of measurement data.

Other implementations of this aspect include corresponding classical and quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises: generating multiple sets of measurement data, wherein each set of measurement data corresponds to a different number of times that the first unitary operator is applied to the system register in the quantum state; and estimating one or more phases, eigenstate amplitudes or expectation values of the first unitary operator or other operators based on the multiple sets of measurement data.

In some implementations the first unitary operator comprises a time evolution operator generated by an N-qubit Hamiltonian.

In some implementations applying the first unitary operator a number of times to the system register in the quantum state comprises applying the time evolution operator evaluated at a respective time step from an interval of predetermined length to the system register in the quantum state.

In some implementations the quantum state comprises a linear combination of one or more eigenstates of the N-qubit Hamiltonian, wherein each eigenstate in the linear combination comprises an associated amplitude.

In some implementations estimating one or more phases, eigenstate amplitudes or expectation values of the first unitary operator or other operators based on one or more sets of measurement data comprises estimating, for each of the one or more sets of measurement data, a phase function of the first unitary operator based on the set of measurement data; and computing the one or more phases, eigenstate amplitudes or expectation values of the first unitary operator or other operators based on the estimated one or more phase functions.

In some implementations measuring the control qubit to obtain a corresponding measurement result m comprises: rotating the control qubit into the X basis and measuring the qubit in the X basis; or rotating the control qubit into the Y basis and measuring the qubit in the Y basis.

In some implementations incrementing the first or second classical variable by $(-1)^m$ comprises incrementing the first classical variable by $(-1)^m$ in response to measuring the control qubit in the X basis or incrementing the second classical variable by $(-1)^m$ in response to measuring the control qubit in the Y basis.

In some implementations estimating a phase function of the first unitary operator based on the set of measurement data comprises computing: i) the final value of the first classical variable in the set of measurement data divided by a total number of times that the control qubit was measured in the X basis, added to ii) i multiplied by the final value of the second classical variable in the set of measurement data divided by a total number of times that the control qubit was measured in the Y basis.

In some implementations the estimated phase function comprises a noisy approximation of a phase function of the first unitary operator, and wherein the method further comprises applying a normalization condition to squares of the amplitudes associated with the respective eigenstates.

In some implementations computing the one or more phases, eigenstate amplitudes or expectation values of the first unitary operator or other operators based on the estimated one or more phase functions comprises applying classical signal processing to the one or more phase functions.

In some implementations computing one or more phases, eigenstate amplitudes or expectation values of the first unitary operator or other operators based on the estimated one or more phase functions comprises estimating eigenvalues and amplitudes corresponding to one or more eigenstates of the N-qubit Hamiltonian.

In some implementations the N-qubit Hamiltonian comprises a linear combination of diagonalizable sub-Hamiltonians, and wherein the method further comprises: performing, for each sub-Hamiltonian, quantum phase estimation of a time evolution operator generated by the sub-Hamiltonian to determine an expectation value of the sub-Hamiltonian, wherein the expectation value comprises a sum of estimated eigenvalues weighted by the estimated amplitudes; summing the determined expectation values of the sub-Hamiltonians to obtain an expectation value of the N-qubit Hamiltonian.

In some implementations performing, for each sub-Hamiltonian, quantum phase estimation of a time evolution operator generated by the sub-Hamiltonian comprises performing quantum phase estimation of a time evolution operator generated by each sub-Hamiltonian in parallel.

In some implementations the method further comprises: performing quantum phase estimation of a time evolution operator generated by the Hamiltonian to determine an expectation value of the Hamiltonian, wherein the expectation value comprises a sum of estimated eigenvalues weighted by the estimated amplitudes.

In some implementations post-selecting on the target computational basis state comprises: determining whether the output quantum state indicates that each qubit was in the target computational basis state prior to measurement; in response to determining that the output quantum state indicates that each qubit was not in the target computational basis state prior to measurement, discarding the current repetition and performing a next repetition.

In some implementations measuring each qubit in the system register to determine an output quantum state of the system register comprises measuring each qubit in the system register in the X or Y basis.

In general, another innovative aspect of the subject matter described in this specification can be implemented in a method for quantum phase estimation of a first N-qubit unitary operator on a quantum state, the method comprising: initializing a first classical variable and a second classical variable; generating a set of measurement data, comprising repeatedly performing a phase estimation experiment, wherein at each repetition a current value of a classical variable is incremented based on a measured outcome of the phase estimation experiment and performing one repetition of the phase estimation experiment comprises: preparing a register comprising N qubits in an initial quantum state, comprising preparing N-1 qubits in a target computational basis state and an N-th qubit in a superposition state; applying a second N-qubit unitary operator to the register in the initial quantum state to obtain a superposition state, the superposition state comprising a superposition of the quantum state and an eigenstate of the first N-qubit unitary operator; applying the first N-qubit unitary operator a number of times to the register in the superposition state to generate an evolved superposition state; applying an inverse of the second N-qubit unitary operator to the register in the evolved superposition state and measuring each of the N-1 qubits in the register to determine an output states of the N-1 qubits; measuring the N-th qubit to obtain a corresponding measurement result m; and post-selecting on the target computational basis state, comprising i) in response to determining that the output states of the N-1 qubits indicate that each of the N-1 qubits were in the target computational basis state prior to measurement, incrementing the first or second classical variable by $(-1)^m$; and estimating one or more phases, eigenstate amplitudes or expectation values of the first unitary operator or other operators based on the set of measurement data.

Other implementations of this aspect include corresponding classical and quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises: generating multiple sets of measurement data, wherein each set of measurement data corresponds to a different number of times that the first unitary operator is applied to the register in the quantum state; and estimating one or more phases, eigenstate amplitudes or expectation values of the first unitary operator or other operators based on the multiple sets of measurement data.

In some implementations the first unitary operator comprises a time evolution operator generated by an N-qubit Hamiltonian.

In some implementations applying the first unitary operator a number of times to the register in the quantum state comprises applying the time evolution operator evaluated at a respective time step from an interval of predetermined length to the register in the quantum state.

In some implementations the quantum state comprises a linear combination of one or more eigenstates of the N-qubit Hamiltonian, wherein each eigenstate in the linear combination comprises an associated amplitude.

In some implementations estimating one or more phases, eigenstate amplitudes or expectation values of the first unitary operator or other operators based on one or more sets of measurement data comprises: estimating, for each of the one or more sets of measurement data, a phase function of the first unitary operator based on the set of measurement data; and computing the one or more phases, eigenstate amplitudes or expectation values of the first unitary operator or other operators based on the estimated one or more phase functions. In some implementations measuring the N-th qubit to obtain a corresponding measurement result m comprises: rotating the N-th qubit into the X basis and measuring the qubit in the X basis; or rotating the N-th qubit into the Y basis and measuring the qubit in the Y basis.

In some implementations incrementing the first or second classical variable by $(-1)^m$ comprises incrementing the first classical variable by $(-1)^m$ in response to measuring the N-th qubit in the X basis or incrementing the second classical variable by $(-1)^m$ in response to measuring the N-th qubit in the Y basis.

In some implementations estimating a phase function of the first unitary operator based on the set of measurement data comprises computing: i) the final value of the first classical variable in the set of measurement data divided by a total number of times that the N-th qubit was measured in the X basis, added to ii) i multiplied by the final value of the second classical variable in the set of measurement data divided by a total number of times that the N-th qubit was measured in the Y basis.

In some implementations the estimated phase function comprises a noisy approximation of a phase function of the first unitary operator, and wherein the method further comprises applying a normalization condition to squares of the amplitudes associated with the respective eigenstates.

In some implementations computing the one or more phases, eigenstate amplitudes or expectation values of the first unitary operator or other operators based on the estimated one or more phase functions comprises applying classical signal processing to the one or more phase functions.

In some implementations computing one or more phases, eigenstate amplitudes or expectation values of the first unitary operator or other operators based on the estimated one or more phase functions comprises estimating eigenvalues and amplitudes corresponding to one or more eigenstates of the N-qubit Hamiltonian.

In some implementations the N-qubit Hamiltonian comprises a linear combination of diagonalizable sub-Hamiltonians, and wherein the method further comprises: performing, for each sub-Hamiltonian, quantum phase estimation of a time evolution operator generated by the sub-Hamiltonian to determine an expectation value of the sub-Hamiltonian, wherein the expectation value comprises a sum of estimated eigenvalues weighted by the estimated amplitudes; summing the determined expectation values of the sub-Hamiltonians to obtain an expectation value of the N-qubit Hamiltonian.

In some implementations performing, for each sub-Hamiltonian, quantum phase estimation of a time evolution operator generated by the sub-Hamiltonian comprises performing quantum phase estimation of a time evolution operator generated by each sub-Hamiltonian independently and in parallel.

In some implementations the method further comprises: performing quantum phase estimation of a time evolution operator generated by the Hamiltonian to determine an expectation value of the Hamiltonian, wherein the expectation value comprises a sum of estimated eigenvalues weighted by the estimated amplitudes.

In some implementations post-selecting on the target computational basis state comprises: determining whether the output quantum state indicates that each qubit was in the target computational basis state prior to measurement; in response to determining that the output quantum state indicates that each qubit was not in the target computational basis state prior to measurement, discarding the current repetition and performing a next repetition.

In some implementations measuring each qubit in the register to determine an output quantum state of the register comprises measuring each qubit in the register in the X or Y basis.

In general, another innovative aspect of the subject matter described in this specification can be implemented in a method for quantum error mitigation in a quantum computing system, the method comprising: generating a set of classical control data comprising at least one classical variable by repeating a plurality of iterations, wherein each iteration comprises: preparing a system register comprising multiple qubits in an initial quantum state; applying a unitary operator to the system register in the initial quantum state to obtain a first evolved quantum state, wherein the unitary operator is dependent on a target quantum computation; performing, conditioned on a state of a control qubit initialized in a superposition state, the target quantum computation on the system register in the first evolved quantum state to obtain a second evolved quantum state; applying an inverse of the unitary operator to the system register in the second evolved quantum state to obtain a third evolved quantum state; and measuring i) each qubit in the system register in the third evolved quantum state to determine an output quantum state of the system register and ii) the control qubit to determine an output quantum state of the control qubit; updating the at least one classical variable using the output quantum state of the control qubit unless the output quantum state of the system register indicates that the system register was not in the initial quantum state prior to measurement; and after the plurality of iterations have been completed, changing an operating parameter of the quantum computing system or adjusting a measured value based on the set of classical control data.

Other implementations of this aspect include corresponding classical and quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

In general, another innovative aspect of the subject matter described in this specification can be implemented in a method for quantum error mitigation in a quantum computing system, the method comprising: generating a set of classical control data comprising at least one classical variable by repeating a plurality of iterations, wherein each iteration comprises: preparing a system register comprising multiple qubits in an initial quantum state; applying a unitary operator to system register in the initial quantum state to obtain a first evolved quantum state, wherein the unitary operator is dependent on a target quantum computation; performing the target quantum computation on the system register in the first evolved quantum state to obtain a second evolved quantum state; applying an inverse of the unitary operator to the system register in the second evolved quantum state and measuring each qubit in the system register to determine an output quantum state of the system register; and after applying the inverse of the unitary operator, updating the at least one classical variable using the output quantum state of the system register unless the output quantum state indicates that the system register was not in the initial quantum state prior to measurement; and after the plurality of iterations have been completed, changing an operating parameter of the quantum computing system or adjusting a measured value based on the set of classical control data.

Other implementations of this aspect include corresponding classical and quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular ways so as to realize one or more of the following advantages.

The presently described techniques enable errors accumulated during quantum phase estimation routines to be mitigated. In particular, by post-selecting the system register to be in the starting state, all single errors are converted prior to final measurement to a time-dependent decay (up to on average exponentially small corrections), which may be accurately corrected for at the cost of additional measurement. Further, by separating the observable of interest into a linear combination of fast-forwardable Hamiltonians and measuring those components individually, the time-dependent decay can be converted into a constant offset. The presently described techniques therefore increase the accuracy of quantum phase estimation compared to conventional techniques that do not incorporate error mitigation.

In turn, the presently described techniques can be performed as a sub-routine in various settings to provide additional mitigation of control error and increase the accuracy of other computational routines, e.g., to increase the accuracy of partial state tomography in a variational quantum eigensolver or any variational algorithm that takes an expectation value as a cost function.

In addition, the presently described error mitigation techniques can be built into phase estimation techniques that do not require control qubits. Therefore, quantum phase accuracy can be achieved with lower hardware complexity.

In addition, the presently described protocols remain robust in the presence of sampling noise, with the number of repetitions required scaling approximately as one over the fidelity of the prepared state.

In addition, the presently described techniques enable eigenphases of a quantum state of a physical system to be accurately estimated and provided for use in an extensive number of computational applications of industrial value. For example, estimated eigenphases may be used to perform quantum simulations, e.g., quantum algorithms for simulating chemistry and molecular reactions, quantum metrology, spectroscopy, factoring algorithms, order finding algorithms, computations of discrete logarithms, database search algorithms, or solving well-conditioned sparse systems of linear equations.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
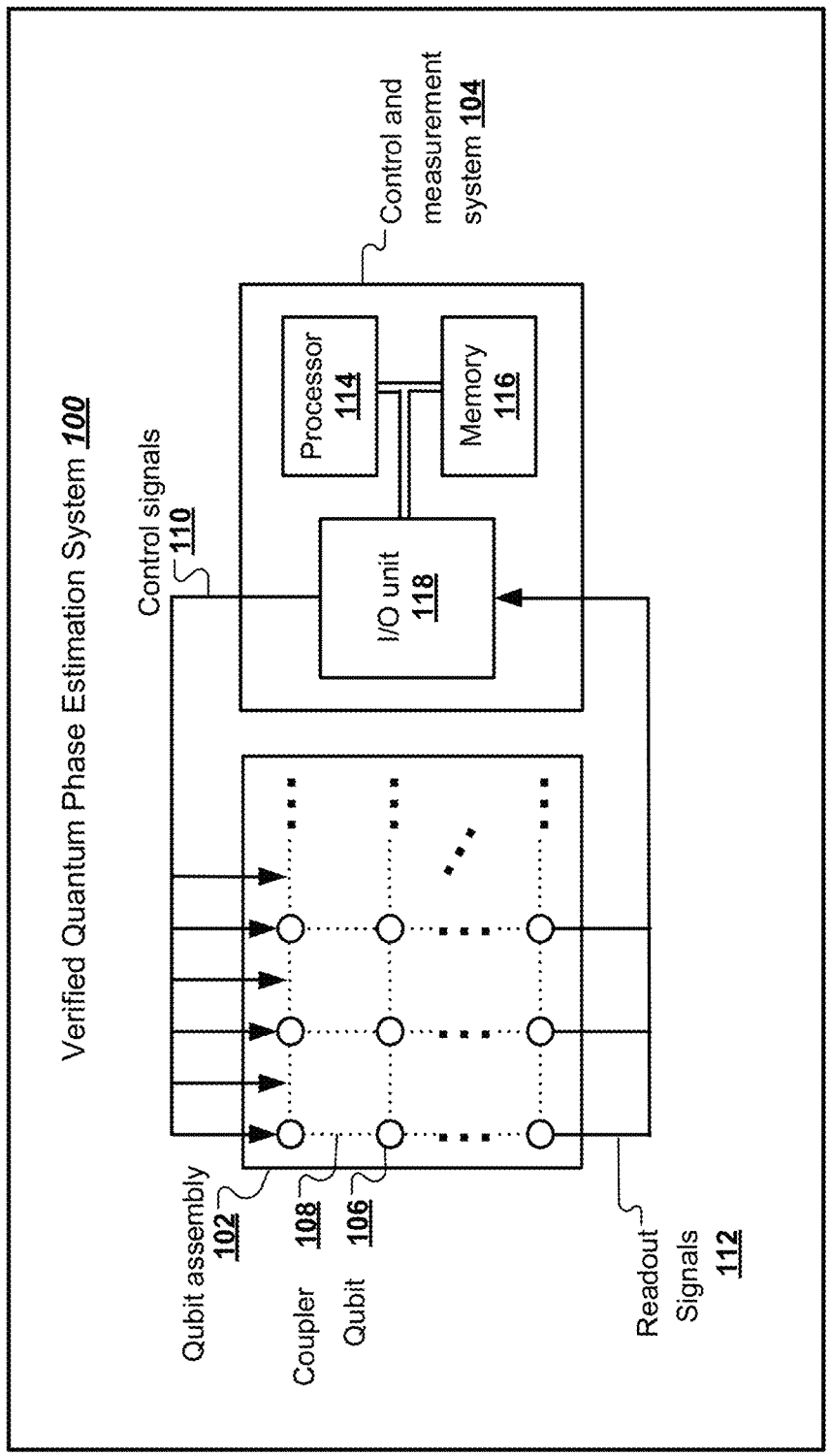
FIG. 1 depicts an example system for performing verified quantum phase estimation.

Quantum phase estimation refers to a family of protocols for learning the eigenphases $e^{i\phi_j}$ of an unitary operator U. Equivalently, quantum phase estimation can be used to learn the eigenvalues $E_j$ of a Hermitian operator H since such operators generate respective unitary operators via exponentiation $U=e^{iHt}$. The eigenvalues of H and the eigenphases of U are related by the same exponentiation and correspond to the same eigen states, e.g., if $H|E_j\rangle=E_j|E_j\rangle$, $U|E_j\rangle=e^{i\phi_j}|E_j\rangle$ and $\phi_j=E_jt$.

The unitary operator can be implemented as a quantum circuit on a quantum system register. Because $e^{i\phi}|\psi\rangle\equiv|\psi\rangle$ for pure states $|\psi\rangle$ and real valued $\phi$, the phase is undetectable if the system register is prepared in a pure state. However, a relative phase between two states is a physical observable that can be detected. Such detection can be achieved by single-control quantum phase estimation.

In single-control quantum phase estimation, the unitary operator is applied conditional upon a control qubit being in the state $|1\rangle$ (and doing nothing when the control qubit is in the state $|0\rangle$). This is commonly written as the "controlled" unitary C-U. When C-U acts on a system register prepared in an eigenstate and a control qubit prepared in a superposition state $|+\rangle$, the global state evolves to $$(C-U)\frac{1}{\sqrt{2}}(|0\rangle+|1\rangle)|E_j\rangle = \frac{1}{\sqrt{2}}(|0\rangle+e^{i\phi_j}|1\rangle)|E_j\rangle.$$

Despite the system register being acted upon, it remains unchanged, whilst the eigenphase $e^{i\phi_j}$ from the system register is kicked back onto the control qubit. The eigenphase $e^{i\phi_j}$ can be estimated by repeatedly performing the single control quantum phase estimation protocol, where at each repetition the control qubit is measured (in the X or Y basis) to obtain a number of single-shot readouts of 1 and 0. From the estimated eigenphase, an eigenvalue $E_j$ can be inferred, e.g., via $$\frac{1}{it}\text{Arg}(e^{i\phi_j}) = E_j$$

mod $2\pi t$.

The error in the estimation of $E_j$ decreases with t, and asymptotically optimal protocols can balance this against the ambiguity modulo $2\pi t$ by repeating the estimation at multiple values oft. In terms of estimating the eigenphases $e^{i\phi_j}$ of a unitary U, this optimization requires repeating the procedure for controlled-$U^k$ (e.g., C-$U^k$) for varying integer points k.

This specification describes an apparatus and method for verified quantum phase estimation. The apparatus and method implement a post-selection mechanism that enables errors accumulated during quantum phase estimation to be mitigated. That is, by measuring qubits in a system register in a basis that includes the initial state in which the qubits were prepared, and post-selecting on those phase estimation experiments which find the system register state to have returned to the initial state, a system implementing the presently described techniques is able to verify against any errors that take the system away from this state. Accordingly, the presently described quantum phase estimation protocols are referred to herein as verified quantum phase estimation protocols.

Example Operating Environment

FIG. 1 depicts an example system 100 for performing verified quantum phase estimation. The example system 100 is an example of a system implemented as classical and quantum computer programs on one or more classical computers and quantum computing devices in one or more locations, in which the systems, components, and techniques described below can be implemented.

The example system can be used to perform the classical and quantum computation operations described in this specification according to some implementations. The example system 100 is intended to represent various forms of quantum computing devices. The components shown here, their connections and relationships, and their functions, are exemplary only, and do not limit implementations of the inventions described and/or claimed in this document.

The example system 100 includes a qubit assembly 102 and a control and measurement system 104. The qubit assembly includes multiple qubits, e.g., qubit 106, that are used to perform algorithmic operations or quantum computations. While the qubits shown in FIG. 1 are arranged in a rectangular array, this is a schematic depiction and is not intended to be limiting. The qubit assembly 102 also includes adjustable coupling elements, e.g., coupler 108, that allow for interactions between coupled qubits. In the schematic depiction of FIG. 1, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits. In addition, in some cases qubits may not be coupled by/interact through physical coupling elements. For example, ion traps can couple qubits via their longitudinal motion. Therefore, in some cases couplings between qubits can be driven, e.g., using a laser, and not achieved through a coupling element. Generally, the type of couplings used depends on the type of qubits used and/or the type of quantum computations to be performed.

Each qubit can be a physical two-level quantum system or device having levels representing logical values of 0 and 1. The specific physical realization of the multiple qubits and how they interact with one another is dependent on a variety of factors including the type of the quantum computing device included in example system 100 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying unitary operators to the qubits, e.g., the unitary operators $U$, $U_p$ described below with reference to FIGS. 2-6. Applying a unitary operator to a quantum state can include applying a corresponding sequence of quantum logic gates to the qubits, e.g., a applying a corresponding quantum circuit to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 110 generated by the control and measurement system 104 to the qubits and to the couplers.

For example, in some implementations the qubits in the qubit assembly 102 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 110 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 110. The measurements cause readout signals 112 representing measurement results to be communicated back to the measurement and control system 104. The readout signals 112 may include RF, microwave, or optical signals depending on the physical scheme for the quantum computing device and/or the qubits. For convenience, the control signals 110 and readout signals 112 shown in FIG. 1 are depicted as addressing only selected elements of the qubit assembly (i.e. the top and bottom rows), but during operation the control signals 110 and readout signals 112 can address each element in the qubit assembly 102.

The control and measurement system 104 is an example of a classical computer system that can be used to perform various operations on the qubit assembly 102, as described above, as well as other classical subroutines or computations, e.g., the classical processing/post processing routines described below with reference to FIGS. 2-6. The control and measurement system 104 includes one or more classical processors, e.g., classical processor 114, one or more memories, e.g., memory 116, and one or more I/O units, e.g., I/O unit 118, connected by one or more data buses. The control and measurement system 104 can be programmed to send sequences of control signals 110 to the qubit assembly, e.g. to carry out a selected series of quantum gate operations, and to receive sequences of readout signals 112 from the qubit assembly, e.g. as part of performing measurement operations.

The processor 114 is configured to process instructions for execution within the control and measurement system 104. In some implementations, the processor 114 is a single-threaded processor. In other implementations, the processor 114 is a multi-threaded processor. The processor 114 is capable of processing instructions stored in the memory 116.

The memory 116 stores information within the control and measurement system 104. In some implementations, the memory 116 includes a computer-readable medium, a volatile memory unit, and/or a non-volatile memory unit. In some cases, the memory 116 can include storage devices capable of providing mass storage for the system 104, e.g. a hard disk device, an optical disk device, a storage device that is shared over a network by multiple computing devices (e.g., a cloud storage device), and/or some other large capacity storage device.

The input/output device 118 provides input/output operations for the control and measurement system 104. The input/output device 118 can include D/A converters, A/D converters, and RF/microwave/optical signal generators, transmitters, and receivers, whereby to send control signals 110 to and receive readout signals 112 from the qubit assembly, as appropriate for the physical scheme for the quantum computer. In some implementations, the input/output device 118 can also include one or more network interface devices, e.g., an Ethernet card, a serial communication device, e.g., an RS-232 port, and/or a wireless interface device, e.g., an 802.11 card. In some implementations, the input/output device 118 can include driver devices configured to receive input data and send output data to other external devices, e.g., keyboard, printer and display devices.

Although an example control and measurement system 104 has been depicted in FIG. 1, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 2:
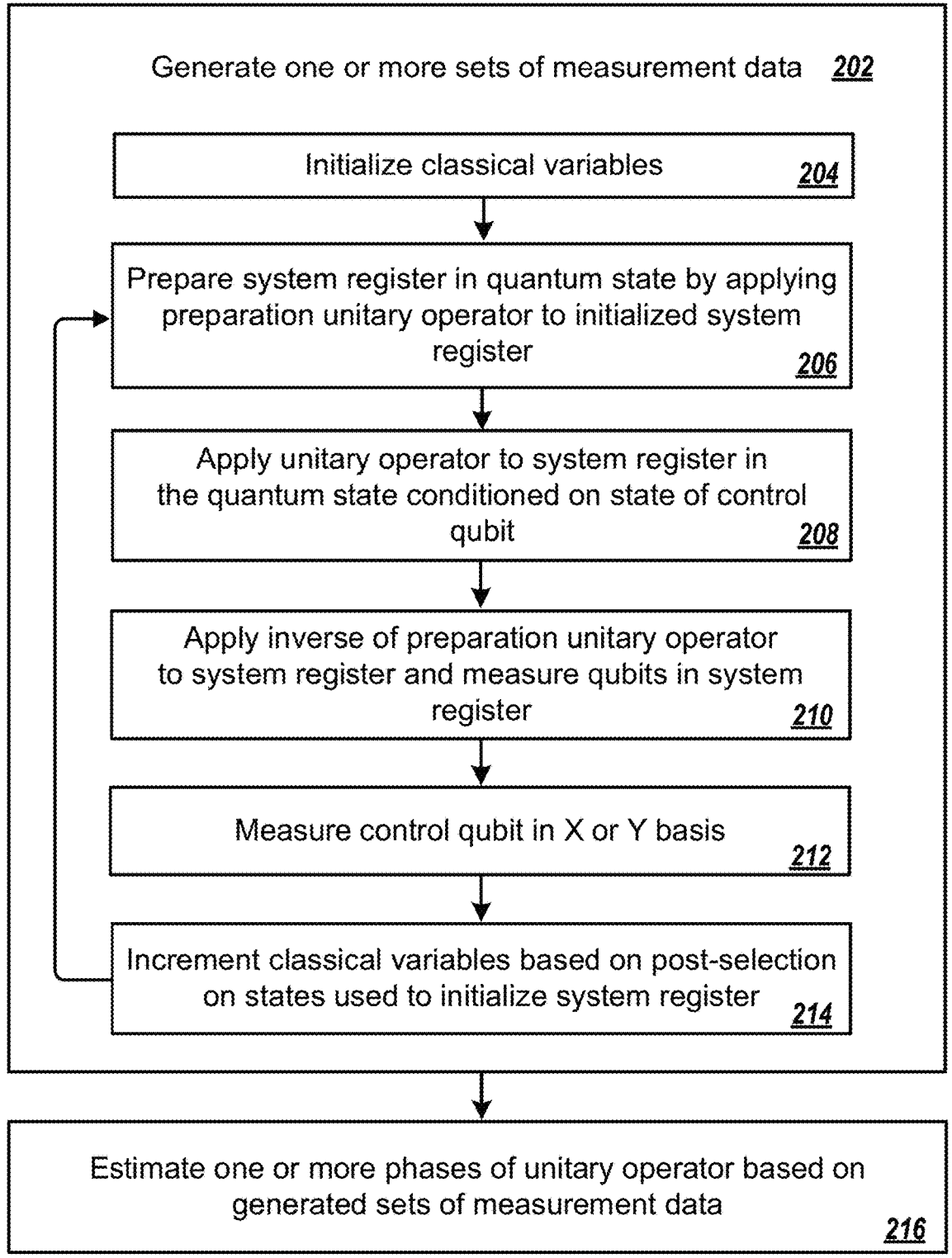
FIG. 2 is a flow diagram of a example process for single-control verified quantum phase estimation.

Programming the Hardware: Example Process for Single-Control Verified Quantum Phase Estimation FIG. 2 is a flowchart of an example process 200 for single-control verified quantum phase estimation of a N-qubit unitary operator U on a quantum state $|\psi\rangle$. For convenience, the process 200 will be described as being performed by a system of one or more classical and quantum computing devices located in one or more locations. For example, the system 100 of FIG. 1, appropriately programmed in accordance with this specification, can perform the process 200.

For convenience, example process 200 is primarily described with reference to single-control verified quantum phase estimation of a N-qubit unitary operator U in the Hermitian operator picture. In the Hermitian operator picture, the unitary operator U is equal to a time evolution operator generated by an N-qubit Hamiltonian H, e.g., $$U=U(t)=e^{iHt} \quad (1)$$

and example process 200 can be applied to learn the eigenphases $e^{iE_jt}$ or eigenvalues $E_j$ of the Hamiltonian H. However, this is a non-limiting example and example process 200 can also be applied to perform single-control verified quantum phase estimation of a unitary operator U in the unitary picture.

The system generates one or more sets of measurement data, where the data included in the one or more sets will be used to estimate the eigenphases/eigenvalues of the unitary operator U (step 202).

In some implementations the system can generate one set of measurement data, where the set corresponds to a respective value of t (or equivalently an integer k). However, as described above, errors in estimated eigenvalues decreases with t, and asymptotically optimal protocols can balance this against the ambiguity modulo $2\pi t$ by repeating the estimation at multiple values of t (or in the case of the unitary picture, repeating the estimation for controlled-$U^k$ for multiple values of integer k). Therefore, in other implementations the system can generate multiple sets of measurement data, where each set of measurement data corresponds to a respective value of t from a predetermined range or interval (or equivalently a number k from a predetermined range or interval). In these implementations, the number of generated sets of measurement data, e.g., the number of different values of t, is selected to allow a sufficient number of phases to be fit to the data. For example, a first value $t_0$ for which no ambiguity exists can first be selected (such a value can always be selected since it is possible to find an upper bound on the size of the eigenvalues). An example data set of values of t can then be selected based on the first value $t_0$, e.g., $\{t_0, 2t_0, 3t_0, 4t_0, \ldots\}$ (i.e. linear spacing) or $\{t_0, 2t_0, 4t_0, 8t_0 \ldots\}$ (i.e., exponential separation between the values, which in some situations can be preferable.)

Generating each set of measurement data includes preparing (or initializing) a first and second classical initial variable, e.g., a first classical initial variable $g^x=0$ and a second classical initial variable $g^y=0$ (step 204) and repeatedly performing a same phase estimation experiment, where at each repetition one of the classical initial variables is incremented based on a measured outcome of the phase estimation experiment. The number of repetitions is selected such that the corresponding set of measurement data includes sufficient statistics for estimating the eigenphases/eigenvalues of the unitary operator. To perform one repetition of the phase estimation experiment, the system implements a quantum circuit, e.g., the quantum circuit shown in FIG. 3, as follows.

The system prepares a system register of N qubits in the quantum state $|\psi\rangle$ (step 206). In some implementations the quantum state $|\psi\rangle$ includes a linear combination of one or more eigenstates $|E\rangle$ of the N-qubit Hamiltonian H, where each eigenstate $|E_j\rangle$ in the linear combination comprises an associated amplitude $a_j$. For example, the quantum state can be given by $$|\psi\rangle = \sum_j a_j |E_j\rangle. \quad (2)$$

Preparing the system register in the quantum state includes preparing each qubit in the system register in a target computational state, e.g., a zero state, and applying a preparation unitary operator $U_p$ to the qubits in the target computational state. The preparation unitary operator $U_p$ is selected so that application of the preparation unitary operator to the qubits prepared in the target computational basis state causes the system register to be in the quantum state $|\psi\rangle$, e.g., $U_p|0\rangle=|\psi\rangle$. The particular form of the preparation unitary operator is dependent on the unitary operator/Hamiltonian for which quantum phase estimation is being performed, as well as the quantum hardware that is being used to perform quantum phase estimation. For example, for free-fermion Hamiltonians the preparation unitary operator $U_p$ can be represented by a Givens rotation circuit.

The system prepares a control qubit in a superposition state, e.g., a plus state. The system then applies, conditioned on a state of a control qubit, the unitary operator U a number of times to the system register in the quantum state $|\psi\rangle$ to generate an evolved quantum state (step 208). More specifically, in the Hermitian operator picture, the system applies the time evolution operator $U(t)=e^{iHt}$ to the system register in the quantum state $|\psi\rangle$ to generate an evolved quantum state, where the value of t depends on the set of measurement data that is currently being generated. In the unitary picture, the system applies $U^k$ to the system register in the quantum state $|\psi\rangle$ to generate an evolved quantum state, where the integer value of k depends on the set of measurement data that is currently being generated. In some implementations, the system can apply the unitary operator U conditioned on the control qubit being in a 1 state.

The system applies an inverse of the preparation unitary operator, e.g., $U_p^\dagger$, to the system register in the evolved quantum state and measures each qubit in the system register to determine an output quantum state of the system register (step 210). In some implementations measuring each qubit in the system register to determine an output quantum state of the system register includes measuring each qubit in the system register in the X or Y basis.

The system measures the control qubit to obtain a corresponding measurement result m∈ 0, 1 (step 212). Measuring the control qubit to obtain a corresponding measurement result includes either rotating the control qubit into the X basis and measuring the qubit in the X basis or rotating the control qubit into the Y basis and measuring the qubit in the Y basis.

The system post-selects on the target computational basis state used to prepare the qubits in the system register at step 206 (step 214). To post-select on the target computational basis state, the system determines whether the output quantum state indicates that each qubit was in the target computational basis state prior to measurement or not. For example, in implementations where each qubit in the system register is prepared in a zero state (prior to application of the preparation unitary operator $U_p$), the system can determine whether the output quantum state of the system register indicates that each qubit was measured to be in the zero state or not.

In response to determining that the output quantum state does indicate that each qubit was in the target computational basis state prior to measurement, the system increments a respective classical variable by $(-1)^m$. For example, if the control qubit was rotated into the X basis and measured in the X basis to obtain a measurement result m=0, the system increments the first classical variable $g^x$ by $(-1)^0=1$. If the control qubit was rotated into the X basis and measured in the X basis to obtain a measurement result m=1, the system increments the first classical variable $g^x$ by $(-1)^1=-1$. Similarly, if the control qubit was rotated into the Y basis and measured in the Y basis to obtain a measurement result m, the system increments the second classical variable $g^y$ by $(-1)^m$.

In response to determining that the output quantum state does not indicate that each qubit was in the target computational basis state prior to measurement, the system discards the current repetition of the phase estimation experiment (in other words, the system increments a respective classical variable by $(0)^m$) and performs a next repetition of the phase estimation experiment (or alternatively, if the current repetition is a last repetition, proceeds to step 216).

The system estimates one or more phases, amplitudes or expectation values of the unitary operator U based on the generated one or more sets of measurement data (step 216). The system can estimate phases, amplitudes or expectation values of the unitary operator U by estimating one or more phase functions of the unitary operator $U(t)=e^{iHt}$, where each phase function g(t) corresponds to a respective value of t and is therefore based on a respective set of measurement data. The phases, amplitudes or expectation values of the unitary operator U can then be inferred classically from the estimated phase functions g(t). For example, the one or more phase functions can be processed, e.g., using classical signal processing techniques, to obtain approximations to eigenvalues (energies) of the Hamiltonian that generates the time evolution operator, e.g., to obtain approximations to eigenvalues corresponding to the eigenstates $|E_j\rangle$ and associated amplitudes $a_j$ included in the quantum state $|\psi\rangle=\Sigma_j a_j|E_j\rangle$.

Each phase function g(t) is defined as a linear combination of one or more phases of the unitary operator, where each phase in the linear combination i) is associated with a respective eigenstate of the one or more eigenstates of the Hamiltonian included in the quantum state $|\psi\rangle$ and ii) is weighted by a square of the amplitude associated with the respective eigenstate. That is, the phase function can be given by $$g(t) = \sum_j |a_j|^2 e^{iE_j t}. \qquad (3)$$

Therefore, to estimate a respective phase function g(t), the system computes i) the value of the first classical variable $g^x$ in the set of measurement data corresponding to t divided by the total number of times that the control qubit was measured in the X basis added to ii) i multiplied by the value of the second classical variable $g^y$ in the set of measurement data corresponding to t divided by the total number of times that the control qubit was measured in the Y basis. That is, the system computes $$\tilde{g}(t) = \frac{g^x}{M_x} + i\frac{g^y}{M_y}. \qquad (4)$$

and estimates g(t) by $\tilde{g}(t)$. In Equation (4) $M_x$ represents the total number of times the control qubit was measured in the X basis at step 212 and $M_y$ represents the total number of times the control qubit was measured in the Y basis at step 212.

Since the determined phase functions can be noisy approximations of exact phase functions of the first unitary operator, in some implementations the system may apply a normalization condition $\Sigma_j|a_j|^2=1$ to the amplitudes associated with the respective eigenstates to renormalize the weights in the phase functions.

The error mitigation from verification comes at the cost of increasing the number of samples required to estimate the phase function g(t). Estimating the phase function to precision E requires that the determined (noisy) approximation of the exact phase function is estimated to precision $p_{ne} \epsilon$ where $p_{ne}$ represents the probability of no error occurring. To obtain $g^x$ and $g^y$ above in Equation (4) a set of M experimental outputs (which can take the values −1, 0 or 1) are averaged over. For an i-th experiment $$P(g_i^x = \pm 1) = \frac{1}{2} p_{ne}(1 \pm g^x) \text{ and } P(g_i^x = 0) = 1 - p_{ne}.$$

The noisy approximation $g_{noise}$ of the exact phase function is then given by $\text{Re}[g_{noise}(t)] = P(g_x^i = 1) - P(g_x^i = -1)$. Since each experiment is i.i.d, the variance of the estimates of these probabilities gives $$\text{Var}[\text{Re}[g_{noise}(t)]] = \frac{1}{M} p_{ne} - \frac{1}{M} p_{ne}^2 [g^x]^2.$$

The requirements to estimate $g_{noise}$ to variance $\epsilon^{-2} p_{ne}^{-2}$ can therefore bounded by $M \geq \epsilon^{-2} p_{ne}^{-1}$.

In some implementations, to mitigate control noise, e.g., the effect of an amplitude damping channel, the initial state of the control qubit can be flipped from the 0 state to the 1 state for 50% of the experiments. This can be compiled into the final pre-rotation, and does not increase the total sampling cost of the experiment (only half as many samples need to be taken at each pre-rotation setting for the same accuracy. Similar biases from other channels can be compensated for by compiling $$a \frac{\pi}{4} Z$$

rotation on the initial control qubit state, and un-compiling it in the final pre-rotation.

The techniques described above with reference to example process 200 can also be applied to mitigate errors in other settings, e.g., settings other than phase estimation. For example, the techniques can be applied to a method for quantum error mitigation in a quantum computing system. In such methods, the system generates a set of classical control data including at least one classical variable by repeating a plurality of iterations. At each iteration the system i) prepares a system register including multiple qubits in an initial quantum state, ii) applies a unitary operator to the system register in the initial quantum state to obtain a first evolved quantum state, where the unitary operator is dependent on a target quantum computation, iii) performs, conditioned on a state of a control qubit initialized in a superposition state, the target quantum computation on the system register in the first evolved quantum state to obtain a second evolved quantum state, iv) applies an inverse of the unitary operator to the system register in the second evolved quantum state to obtain a third evolved quantum state, v) measures a) each qubit in the system register in the third evolved quantum state to determine an output quantum state of the system register and b) the control qubit to determine an output quantum state of the control qubit, and vi) updates the at least one classical variable using the output quantum state of the control qubit unless the output quantum state of the system register indicates that the system register was not in the initial quantum state prior to measurement. After the plurality of iterations have been completed, the system changes an operating parameter of the quantum computing system or adjusts a measured value based on the set of classical control data, e.g., to account for errors detected through analysis of the control data.

Figure 3:
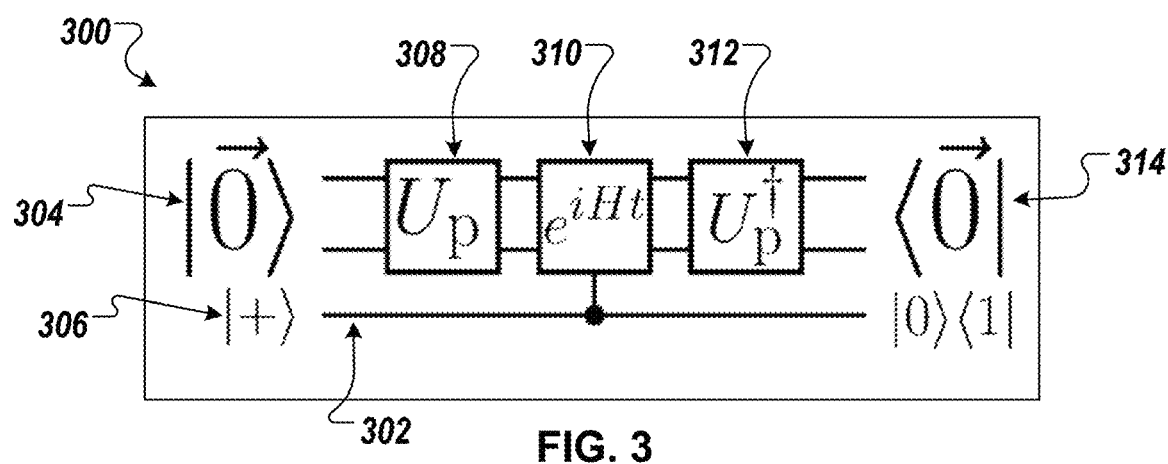
FIG. 3 is a circuit diagram of an example quantum circuit for single-control verified quantum phase estimation.

FIG. 3 is a circuit diagram 300 of an example quantum circuit for single-control verified quantum phase estimation. In the example quantum circuit, the top two horizontal lines represent the system register of N qubits. The bottom horizontal line 302 represents the control qubit. The system register is prepared in a zero state 304, that is each qubit in the system register is prepared in a zero state. The control qubit 302 is prepared in a plus state 306. The preparation unitary operator 308 is applied to the system register. The unitary operator (or time evolution operator generated by the Hamiltonian) 310 is applied to the system register, conditioned on the state of the control qubit 302. An inverse of the preparation unitary operator 312 is applied to the system register.

The circuit output shows an ideal circuit output, e.g., an output corresponding to error-free implementations of the preparation unitary operator and time evolution operator. That is, the system register is shown to be in the zero state 314 after the inverse of the preparation unitary is applied. The control qubit 302 can be measured to determine the phase of the unitary operator 310.

Figure 4:
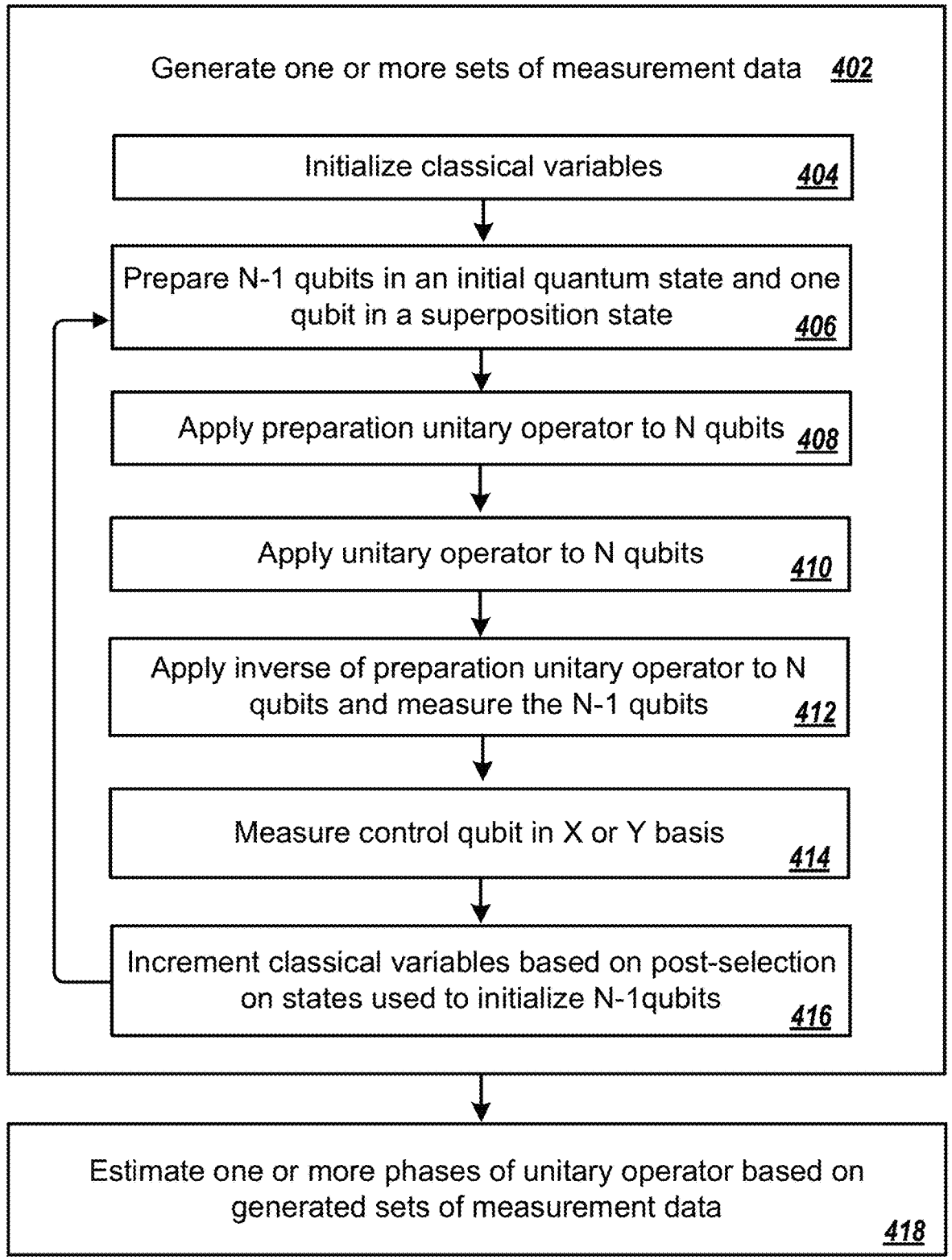
FIG. 4 is a flow diagram of an example process for control-free verified quantum phase estimation.

Programming the Hardware: Example Process for Verified Control Free Phase Estimation Making time evolution conditional on a control qubit does not increase the asymptotic cost of the circuit, but it does require an additional overhead. FIG. 4 is a flow diagram 400 of an example process for control-free verified quantum phase estimation of a N-qubit unitary operator U on a quantum state $|\psi\rangle$. For convenience, the process 400 will be described as being performed by a system of one or more classical and quantum computing devices located in one or more locations. For example, the system 100 of FIG. 1, appropriately programmed in accordance with this specification, can perform the process 400.

As described above with reference to example process 200 of FIG. 2, example process 400 is described with reference to performing verified quantum phase estimation of a N-qubit unitary operator U in the Hermitian operator picture. However, this is a non-limiting example and example process 400 can also be applied to perform verified quantum phase estimation of a N-qubit unitary operator U in the unitary picture.

The system generates one or more sets of measurement data (step 402) and initializes a first and second classical variable (step 404). Steps 402 and 404 of example process 400 are similar to steps 202 and 204 of example process 200. Therefore, for the sake of brevity, details are not repeated.

As described above with reference to step 202 of example process 200, generating each set of measurement data includes repeatedly performing a phase estimation experiment. To perform one repetition of the phase estimation experiment, the system implements a quantum circuit, e.g., the quantum circuit shown in FIG. 5, as follows.

The system prepares a register of N qubits in an initial quantum state (step 406). Preparing the system register in the quantum state includes preparing N-1 qubits in a target computational basis state, e.g., a zero state, and an N-th qubit in a superposition state, e.g., a plus state through application of a Hadamard gate. The register is then in the state $1/\sqrt{2}(|0\rangle + |\vec{1}_T\rangle)$ where $|\vec{1}_T\rangle$ represents the basis state where the target qubit is in the $|1\rangle$ state and all other qubits are in $|0\rangle$.

The system applies an N-qubit preparation unitary operator $U_p$ to the register in the initial quantum state to obtain a superposition state (step 408). The obtained superposition state is a superposition of the quantum state $|\psi\rangle$ and an eigenstate $|E_j\rangle$ of the Hamiltonian H, e.g.

$$\frac{1}{\sqrt{2}}(|\psi\rangle + |E_j\rangle).$$

The N-qubit preparation unitary operator $U_p$ performs the mapping $U_p|0\rangle \rightarrow |\Psi_r\rangle$, $U_p|\vec{1}_T\rangle \rightarrow |\Psi_s\rangle$ where $|\Psi_s\rangle = |\psi\rangle|1\rangle$ and $|\Psi_r\rangle = |\psi\rangle|0\rangle$ with $|\psi\rangle$ as defined in Equation (2) above. After step 406 and 408, the register is in the state $$\frac{1}{\sqrt{2}}(|\Psi_s\rangle + |\Psi_r\rangle).$$

As discussed above, the particular form of the preparation unitary operator is dependent on the unitary operator/Hamiltonian for which quantum phase estimation is being performed, as well as the quantum hardware that is being used to perform quantum phase estimation. For example, for free-fermion Hamiltonians the preparation unitary operator $U_P$ can be represented by a Givens rotation circuit, e.g., $$U_p = U(\vec{\theta}) \prod_{j=N_f-1}^{1} CNOT_{j-1,j}$$

where $U(\vec{\theta}) = \exp(i\Sigma_{j,l} \vec{\theta}_{j,l} c_j^\dagger c_l)$ with $c_j^\dagger$, $c_j$ representing creation and annihilation operators for a fermion on site j, $\vec{\theta}_{j,l} = \vec{\theta}_{l,j}$ are system parameters, $N_f$ represents the number of qubits, and $CNOT_{j-1,j}$ represents a CNOT gate acting on qubits j−1, j.

The system applies the unitary operator U a number of times to the register in the superposition state to generate an evolved superposition state (step 410). Step 410 is similar to step 208 of example process 200, except that application of the unitary operator is not conditioned on the state of a control qubit. Therefore, for brevity, further details are not repeated.

The system applies an inverse of the N-qubit preparation unitary operator to the register in the evolved superposition state and measures each of the N-1 qubits in the register to determine an output states of the N-1 qubits (step 412). Step 412 is similar to step 210 of example process 200 and further details are not repeated.

The system measures the N-th qubit to obtain a corresponding measurement result m∈ 0,1 (step 414). Measuring the N-th qubit to obtain a corresponding measurement result includes either rotating the N-th qubit into the X basis and measuring the qubit in the X basis or rotating the N-th qubit into the Y basis and measuring the qubit in the Y basis.

The system post-selects on the target computational basis state used to prepare the N-1 qubits in the register at step 404 (step 416). Step 412 is similar to step 210 of example process 200. That is, to post-select on the target computational basis state, the system determines whether the output quantum states of the N-1 qubits indicate that each of the N-1 qubits were in the target computational basis state prior to measurement or not. In response to determining that the output quantum states of the N-1 qubits do indicate that each of the N-1 qubits were in the target computational basis state prior to measurement, the system increments a respective classical initial variable by $(-1)^m$. For example, if the N-th qubit was rotated into the X basis and measured in the X basis to obtain a measurement result m, the system increments the first classical initial variable $g^x$ by $(-1)^m$. Similarly, if the N-th qubit was rotated into the Y basis and measured in the Y basis to obtain a measurement result m, the system increments the second classical initial variable $g^y$ by $(-1)^m$. In response to determining that the output quantum states of the N-1 qubits do not indicate that each of the N-1 qubits were in the target computational basis state prior to measurement, the system discards the current repetition of the phase estimation experiment and performs a next repetition of the phase estimation experiment (or alternatively proceeds to step 418). For the sake of brevity, further details are not repeated.

The system estimates one or more phases of the unitary operator U based on the generated one or more sets of measurement data (step 418). Step 418 of example process 400 is similar to step 216 of example process 200. Therefore, for the sake of brevity, details are not repeated.

The techniques described above with reference to example process 400 can also be applied to mitigate errors in other settings, e.g., settings other than phase estimation. For example, the techniques can be applied to a method for quantum error mitigation in a quantum computing system. In such methods, the system generates a set of classical control data including at least one classical variable by repeating a plurality of iterations. At each iteration the system i) prepares a system register comprising multiple qubits in an initial quantum state, ii) applies a unitary operator to the system register in the initial quantum state to obtain a first evolved quantum state, where the unitary operator is dependent on a target quantum computation, iii) performs the target quantum computation on the system register in the first evolved quantum state to obtain a second evolved quantum state, iv) applies an inverse of the unitary operator to the system register in the second evolved quantum state and measures each qubit in the system register to determine an output quantum state of the system register, and v) after applying the inverse of the unitary operator, updates the at least one classical variable using the output quantum state of the system register unless the output quantum state indicates that the system register was not in the initial quantum state prior to measurement. After the plurality of iterations have been completed, the system changes an operating parameter of the quantum computing system or adjusts a measured value based on the set of classical control data, e.g., to account for errors detected through analysis of the control data.

Figure 5:
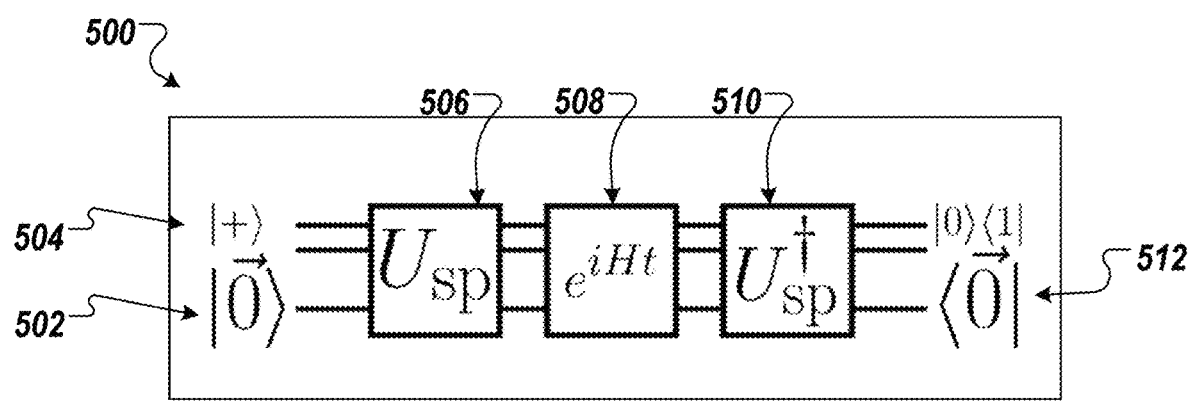
FIG. 5 is a circuit diagram of an example quantum circuit for control-free verified quantum phase estimation.

FIG. 5 is a circuit diagram 500 of an example quantum circuit for control-free verified quantum phase estimation. In the example quantum circuit, the horizontal lines represent the register of N qubits. The top horizontal line represents the N-th qubit. The middle and bottom horizontal lines represent the N-1 qubits. The N-1 qubits are each prepared in a zero state 502. The N-th qubit is prepared in a plus state 504. The preparation unitary operator 506 is applied to the register. The unitary operator (or time evolution operator generated by the Hamiltonian) 508 is applied to the register. An inverse of the preparation unitary operator 510 is applied to the register. The circuit output shows an ideal circuit output, e.g., an output corresponding to error-free implementations of the preparation unitary operator and time evolution operator. That is, the N-1 qubits are shown to be in the zero state 512 after the inverse of the preparation unitary is applied. The N-th qubit can be measured to determine the phase of the unitary operator 508.

Programming the Hardware: Example Process for Verified Expectation Value Estimation In some implementations an estimation of the eigenvalues of a Hermitian operator H may not be of interest, but instead its expectation value $\langle H \rangle$ under a specified quantum state $|\psi\rangle$. For example, in a variational quantum eigensolver (VQE), a state $|\psi(\vec{\theta})\rangle = U(\vec{\theta})|0\rangle$ is prepared, where $\vec{\theta}$ represents a set of classical input parameters. The expectation value $E(\vec{\theta}) = \langle \psi(\vec{\theta})|H|\psi(\vec{\theta})\rangle$ is then measured. The measurement result is optimized (e.g. minimized) over $\vec{\theta}$ in a classical outer loop (e.g. using a classical optimization routine, such as gradient descent, to iteratively adjust the values of $\vec{\theta}$), where the optimized state $|\psi(\vec{\theta}_{opt})\rangle$ provides an approximation of the true ground state $|E\rangle$. Typically, $\langle \psi(\vec{\theta})|H|\psi(\vec{\theta})\rangle$ is estimated by means of partial state tomography. However, noise in the preparation unitary $U(\vec{\theta})$ causes an error-full state $\rho_{error}(\vec{\theta}) \neq |\psi(\vec{\theta})\rangle\langle\psi(\vec{\theta})|$ to be prepared and tomographed, propagating the preparation error directly to a final estimation error.

The techniques described in example processes 200 and 400 provide an improvement to the state of the art, and can mitigate errors in the preparation unitary $U_p$. Therefore, because the amplitude and eigenvalue data obtained from example process 200 (or example process 400) allow for the reconstruction of the expectation values $$\langle \psi(\vec{\theta})|H|\psi(\vec{\theta})\rangle = \Sigma_j |a_j|^2 E_j,$$

verified phase estimation can be used as a tool for error mitigated state tomography within a VQE. Combining the presently described techniques with such variational routines can also allow for mitigation of various sources of control error that may not be correctable by the presently described techniques.

To determine an expectation value of a Hamiltonian on a quantum state $|\psi\rangle$, the system separates the Hamiltonian into a linear combination of diagonalizable sub-Hamiltonians, e.g., $H = \Sigma_b H_b$. In some implementations the system can choose one or more of the sub-Hamiltonians to be fast-forwardable, e.g., a Hamiltonian for which a circuit implementation of a time evolution operator generated by the Hamiltonian has constant depth in the time t. Selecting fast-forwardable sub-Hamiltonians can further mitigate error. Although fast-forwarding is not possible for arbitrary H, decomposition of any sparse, row-computable H into a linear combination of polynomially many fast-forwardable Hamiltonians is always possible. For example, the N qubit Pauli operators $P_i \in \{I, X, Y, Z\}^{\otimes N}$ form a basis for the set of all N qubit operators and are themselves fast forwardable.

The system then performs steps 202-214 (or steps 402-416) for each time evolution operator generated by a respective sub-Hamiltonian $H_b$ to determine respective expectation values of the sub-Hamiltonians. In some implementations the system can perform steps 202-214 (or steps 402-416) for each time evolution operator generated by a respective sub-Hamiltonian $H_b$ in parallel. The system can then sum the determined expectation values of the sub-Hamiltonians to obtain an expectation value of the Hamiltonian, e.g., $\langle H \rangle = \Sigma_b \langle H_b \rangle$. An example process for determining an expectation value of a Hamiltonian on a quantum state is illustrated and described below with reference to FIG. 6.

In some implementations, instead of analysing estimated phase functions at different values of t, as described above with reference to step 216, the system can determine an expectation value of a Hamiltonian on a quantum state $|\psi\rangle$ by expanding $$\text{Im}[g(t)] = \sum_j |a_j|^2 \sin(E_j t)$$
$$= t\sum_j |a_j|^2 E_j + \frac{1}{3} t^3 \sum_j |a_j|^2 E_j^3 + O(t^5)$$

to obtain $$\frac{1}{t}\text{Im}[g(t)] = \langle \psi(\vec{\theta})|H|\psi(\vec{\theta})\rangle + O(t^2)$$

and estimating Im(g(t)) for short times t. In these implementations, normalization is performed by implementing a normalization condition that $g(0) = \Sigma_j |a_j|^2$ to obtain $$\langle H \rangle = \frac{\text{Im}[g(t)]}{t|g(0)|} + O(t^2). \quad (5)$$

Figure 6:
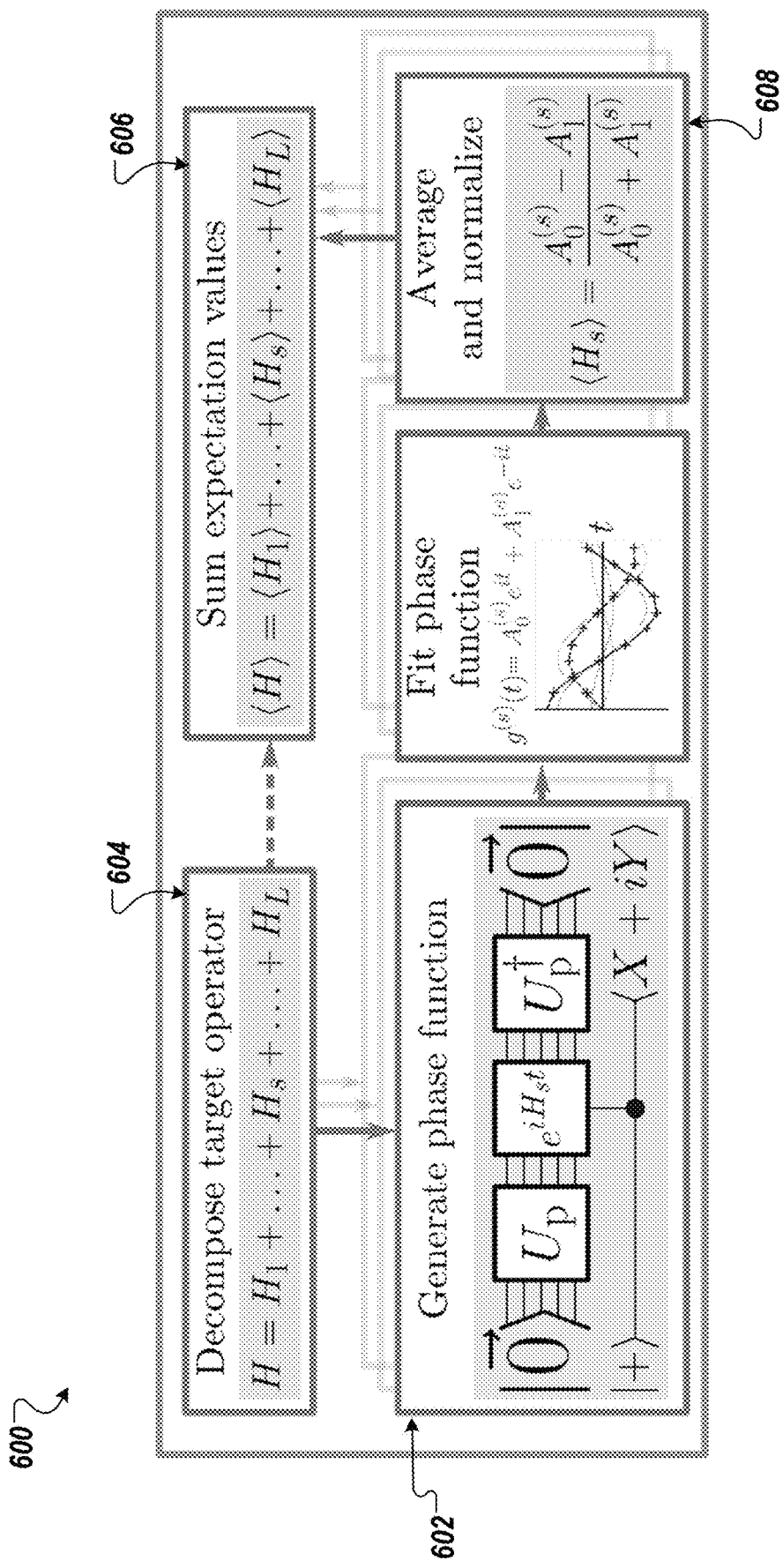
FIG. 6 is a process diagram of an example protocol for single-control verified estimation of the expectation value of a Hamiltonian.

FIG. 6 is a process diagram 600 of an example protocol for verified estimation of the expectation value of a Hamiltonian $H = H_0 + H_1 + \ldots H_{N_f}$ on a quantum state $|\psi\rangle = U_p|0\rangle$. Boxes 602 represent circuits to be executed or data to be extracted from a quantum computer. Boxes 604, 606, and 608 represent signal details to be estimated via classical post-processing.

The protocol proceeds as follows: a complex Hamiltonian H is split into a number of fast-forwardable summands $H_s$ (box 604). The spectral function g(t) of Iii) under time evolution of each piece is obtained (box 602) via single control verified quantum phase estimation (although control-free verified quantum phase estimation could also be used). The resulting data is a weighted sum of oscillations with frequencies equal to the eigenvalues $E_j^{(s)}$ of the corresponding factor (box 610), and may be decomposed by a variety of classical post-processing techniques to obtain approximations for the expectation values $\langle H_s \rangle$, depending on the type of $H_s$ chosen. The type of classical post-processing technique can depend on the type of $H_s$ chosen (box 608). Regardless of the method used, the expectation values are rescaled to obey a normalization condition. Because the expectation value is linear, the obtained verified estimates of $\langle H_s \rangle$ may be summed together to give a verified estimate for $\langle H \rangle$ (box 606).

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for quantum phase estimation of a first N-qubit unitary operator on a quantum state, the method comprising:
    initializing a first classical variable and a second classical variable;
    generating a set of measurement data, comprising repeatedly performing a phase estimation experiment, wherein at each repetition a current value of a classical variable is incremented based on a measured outcome of the phase estimation experiment and performing one repetition of the phase estimation experiment comprises:
        preparing a system register comprising N qubits in the quantum state, comprising applying a second unitary operator to the system register, wherein prior to application of the second unitary operator each qubit in the system register is initialized in a target computational basis state;
        applying, conditioned on a state of a control qubit, the first unitary operator a number of times to the system register in the quantum state to generate an evolved quantum state, wherein prior to application of the first unitary operator a number of times the control qubit is initialized in a superposition state;
        applying an inverse of the second unitary operator to the system register in the evolved quantum state and measuring each qubit in the system register to determine an output quantum state of the system register;
        measuring the control qubit to obtain a corresponding measurement result m; and
        post-selecting on the target computational basis state, comprising in response to determining that the output quantum state indicates that each qubit was in the target computational basis state prior to measurement, incrementing the first or second classical variable by $(-1)^m$; and
    estimating one or more phases, eigenstate amplitudes or expectation values of the first unitary operator or other operators based on the set of measurement data.

2. The method of claim 1, wherein the method further comprises:
    generating multiple sets of measurement data, wherein each set of measurement data corresponds to a different number of times that the first unitary operator is applied to the system register in the quantum state; and estimating one or more phases, eigenstate amplitudes or expectation values of the first unitary operator or other operators based on the multiple sets of measurement data.

3. The method of claim 1, wherein the first unitary operator comprises a time evolution operator generated by an N-qubit Hamiltonian.

4. The method of claim 3, wherein applying the first unitary operator a number of times to the system register in the quantum state comprises applying the time evolution operator evaluated at a respective time step from an interval of predetermined length to the system register in the quantum state.

5. The method of claim 3, wherein the quantum state comprises a linear combination of one or more eigenstates of the N-qubit Hamiltonian, wherein each eigenstate in the linear combination comprises an associated amplitude.

6. The method of claim 1, wherein estimating one or more phases, eigenstate amplitudes or expectation values of the first unitary operator or other operators based on one or more sets of measurement data comprises:
estimating, for each of the one or more sets of measurement data, one or more phase functions of the first unitary operator or other operators based on the set of measurement data; and
computing the one or more phases, eigenstate amplitudes or expectation values of the first unitary operator or other operators based on the estimated one or more phase functions.

7. The method of claim 6, wherein measuring the control qubit to obtain a corresponding measurement result m comprises:
rotating the control qubit into the X basis and measuring the control qubit in the X basis; or
rotating the control qubit into the Y basis and measuring the control qubit in the Y basis.

8. The method of claim 7, wherein incrementing the first or second classical variable by $(-1)^m$ comprises incrementing the first classical variable by $(-1)^m$ in response to measuring the control qubit in the X basis or incrementing the second classical variable by $(-1)^m$ in response to measuring the control qubit in the Y basis.

9. The method of claim 8, wherein estimating a phase function of the first unitary operator based on the set of measurement data comprises computing:
i) the final value of the first classical variable in the set of measurement data divided by a total number of times that the control qubit was measured in the X basis, added to
ii) i multiplied by the final value of the second classical variable in the set of measurement data divided by a total number of times that the control qubit was measured in the Y basis.

10. The method of claim 6, wherein the estimated phase functions comprise noisy approximations of a phase function of the first unitary operator, and wherein the method further comprises applying a normalization condition to squares of the amplitudes associated with the respective eigenstates.

11. The method of claim 6, wherein computing the one or more phases, eigenstate amplitudes or expectation values of the first unitary operator or other operators based on the estimated one or more phase functions comprises applying classical signal processing to the one or more phase functions.

12. The method of claim 11, wherein computing one or more phases, eigenstate amplitudes or expectation values of the first unitary operator or other operators based on the estimated one or more phase functions comprises estimating eigenvalues and amplitudes corresponding to one or more eigenstates of an N-qubit Hamiltonian.

13. The method of claim 12, wherein the N-qubit Hamiltonian comprises a linear combination of diagonalizable sub-Hamiltonians, and wherein the method further comprises:
performing, for each sub-Hamiltonian, quantum phase estimation of a time evolution operator generated by the sub-Hamiltonian to determine an expectation value of the sub-Hamiltonian, wherein the expectation value comprises a sum of estimated eigenvalues weighted by the estimated amplitudes;
summing the determined expectation values of the sub-Hamiltonians to obtain an expectation value of the N-qubit Hamiltonian.

14. The method of claim 13, wherein performing, for each sub-Hamiltonian, quantum phase estimation of a time evolution operator generated by the sub-Hamiltonian comprises performing quantum phase estimation of a time evolution operator generated by each sub-Hamiltonian in parallel.

15. The method of claim 12, wherein the method further comprises:
performing quantum phase estimation of a time evolution operator generated by the N-qubit Hamiltonian to determine an expectation value of the N-qubit Hamiltonian, wherein the expectation value comprises a sum of estimated eigenvalues weighted by the estimated amplitudes.

16. The method of claim 1, wherein post-selecting on the target computational basis state comprises:
determining whether the output quantum state indicates that each qubit was in the target computational basis state prior to measurement;
in response to determining that the output quantum state indicates that each qubit was not in the target computational basis state prior to measurement, discarding the current repetition and performing a next repetition.

17. The method of claim 1, wherein measuring each qubit in the system register to determine an output quantum state of the system register comprises measuring each qubit in the system register in the X or Y basis.

18. An apparatus for quantum phase estimation of a first N-qubit unitary operator on a quantum state, the apparatus comprising:
one or more classical processors; and
quantum computing hardware in data communication with the one or more classical processors, wherein the quantum computing hardware comprises:
one or more system registers, each system register comprising one or more qubits,
one or more control qubits, and
a plurality of control devices configured to operate the one or more system registers and one or more control qubits;
wherein the apparatus is configured to perform operations comprising:
initializing a first classical variable and a second classical variable;
generating a set of measurement data, comprising repeatedly performing a phase estimation experiment, wherein at each repetition a current value of a classical variable is incremented based on a measured outcome of the phase estimation experiment and performing one repetition of the phase estimation experiment comprises:

preparing a system register comprising N qubits in the quantum state, comprising applying a second unitary operator to the system register, wherein prior to application of the second unitary operator each qubit in the system register is initialized in a target computational basis state;

applying, conditioned on a state of a control qubit, the first unitary operator a number of times to the system register in the quantum state to generate an evolved quantum state, wherein prior to application of the first unitary operator a number of times the control qubit is initialized in a superposition state;

applying an inverse of the second unitary operator to the system register in the evolved quantum state and measuring each qubit in the system register to determine an output quantum state of the system register;

measuring the control qubit to obtain a corresponding measurement result m; and post-selecting on the target computational basis state, comprising in response to determining that the output quantum state indicates that each qubit was in the target computational basis state prior to measurement, incrementing the first or second classical variable by $(-1)^m$; and estimating one or more phases, eigenstate amplitudes or expectation values of the first unitary operator or other operators based on the set of measurement data.

19. A method for quantum phase estimation of a first N-qubit unitary operator on a quantum state, the method comprising:

initializing a first classical variable and a second classical variable;

generating a set of measurement data, comprising repeatedly performing a phase estimation experiment, wherein at each repetition a current value of a classical variable is incremented based on a measured outcome of the phase estimation experiment and performing one repetition of the phase estimation experiment comprises:

preparing a register comprising N qubits in an initial quantum state, comprising preparing N-1 qubits in a target computational basis state and an N-th qubit in a superposition state;

applying a second N-qubit unitary operator to the register in the initial quantum state to obtain a superposition state, the superposition state comprising a superposition of the quantum state and an eigenstate of the first N-qubit unitary operator;

applying the first N-qubit unitary operator a number of times to the register in the superposition state to generate an evolved superposition state;

applying an inverse of the second N-qubit unitary operator to the register in the evolved superposition state and measuring each of the N-1 qubits in the register to determine output states of the N-1 qubits;

measuring the N-th qubit to obtain a corresponding measurement result m; and post-selecting on the target computational basis state, comprising in response to determining that the output states of the N-1 qubits indicate that each of the N-1 qubits were in the target computational basis state prior to measurement, incrementing the first or second classical variable by $(-1)^m$; and estimating one or more phases, eigenstate amplitudes or expectation values of the first unitary operator based on the set of measurement data.

20. An apparatus for quantum phase estimation of a first N-qubit unitary operator on a quantum state, the apparatus comprising:

one or more classical processors; and quantum computing hardware in data communication with the one or more classical processors, wherein the quantum computing hardware comprises:

one or more qubit registers, each qubit register comprising one or more qubits, a plurality of control devices configured to operate the one or more qubit registers;

wherein the apparatus is configured to perform operations comprising:

initializing a first classical variable and a second classical variable;

generating a set of measurement data, comprising repeatedly performing a phase estimation experiment, wherein at each repetition a current value of a classical variable is incremented based on a measured outcome of the phase estimation experiment and performing one repetition of the phase estimation experiment comprises:

preparing a register comprising N qubits in an initial quantum state, comprising preparing N-1 qubits in a target computational basis state and an N-th qubit in a superposition state;

applying a second N-qubit unitary operator to the register in the initial quantum state to obtain a superposition state, the superposition state comprising a superposition of the quantum state and an eigenstate of the first N-qubit unitary operator;

applying the first N-qubit unitary operator a number of times to the register in the superposition state to generate an evolved superposition state;

applying an inverse of the second N-qubit unitary operator to the register in the evolved superposition state and measuring each of the N-1 qubits in the register to determine output states of the N-1 qubits;

measuring the N-th qubit to obtain a corresponding measurement result m; and post-selecting on the target computational basis state, comprising in response to determining that the output states of the N-1 qubits indicate that each of the N-1 qubits were in the target computational basis state prior to measurement, incrementing the first or second classical variable by $(-1)^m$; and estimating one or more phases, eigenstate amplitudes or expectation values of the first unitary operator based on the set of measurement data.

21. A method for quantum error mitigation in a quantum computing system, the method comprising:

generating a set of classical control data comprising at least one classical variable by repeating a plurality of iterations, wherein each iteration comprises:

preparing a system register comprising multiple qubits in an initial quantum state;

applying a unitary operator to the system register in the initial quantum state to obtain a first evolved quantum state, wherein the unitary operator is dependent on a target quantum computation;

performing, conditioned on a state of a control qubit initialized in a superposition state, the target quantum computation on the system register in the first evolved quantum state to obtain a second evolved quantum state;

applying an inverse of the unitary operator to the system register in the second evolved quantum state to obtain a third evolved quantum state; and measuring i) each qubit in the system register in the third evolved quantum state to determine an output quantum state of the system register and ii) the control qubit to determine an output quantum state of the control qubit;

updating the at least one classical variable using the output quantum state of the control qubit unless the output quantum state of the system register indicates that the system register was not in the initial quantum state prior to measurement; and after the plurality of iterations have been completed, changing an operating parameter of the quantum computing system or adjusting a measured value based on the set of classical control data.

22. An apparatus comprising:

one or more classical processors; and quantum computing hardware in data communication with the one or more classical processors, wherein the quantum computing hardware comprises:
one or more system registers, each system register comprising one or more qubits,
one or more control qubits, and
a plurality of control devices configured to operate the one or more system registers and one or more control qubits;

wherein the apparatus is configured to perform operations comprising:

generating a set of classical control data comprising at least one classical variable by repeating a plurality of iterations, wherein each iteration comprises:
preparing a system register comprising multiple qubits in an initial quantum state;
applying a unitary operator to the system register in the initial quantum state to obtain a first evolved quantum state, wherein the unitary operator is dependent on a target quantum computation;
performing, conditioned on a state of a control qubit initialized in a superposition state, the target quantum computation on the system register in the first evolved quantum state to obtain a second evolved quantum state;
applying an inverse of the unitary operator to the system register in the second evolved quantum state to obtain a third evolved quantum state; and
measuring i) each qubit in the system register in the third evolved quantum state to determine an output quantum state of the system register and ii) the control qubit to determine an output quantum state of the control qubit;
updating the at least one classical variable using the output quantum state of the control qubit unless the output quantum state of the system register indicates that the system register was not in the initial quantum state prior to measurement; and after the plurality of iterations have been completed, changing an operating parameter of the quantum computing system or adjusting a measured value based on the set of classical control data.

23. A method for quantum error mitigation in a quantum computing system, the method comprising:

generating a set of classical control data comprising at least one classical variable by repeating a plurality of iterations, wherein each iteration comprises:
preparing a system register comprising multiple qubits in an initial quantum state;
applying a unitary operator to the system register in the initial quantum state to obtain a first evolved quantum state, wherein the unitary operator is dependent on a target quantum computation;
performing the target quantum computation on the system register in the first evolved quantum state to obtain a second evolved quantum state;
applying an inverse of the unitary operator to the system register in the second evolved quantum state and measuring each qubit in the system register to determine an output quantum state of the system register; and
after applying the inverse of the unitary operator, updating the at least one classical variable using the output quantum state of the system register unless the output quantum state indicates that the system register was not in the initial quantum state prior to measurement; and after the plurality of iterations have been completed, changing an operating parameter of the quantum computing system or adjusting a measured value based on the set of classical control data.

24. An apparatus comprising:

one or more classical processors; and quantum computing hardware in data communication with the one or more classical processors, wherein the quantum computing hardware comprises:
one or more qubit registers, each qubit register comprising one or more qubits,
a plurality of control devices configured to operate the one or more qubit registers;

wherein the apparatus is configured to perform operations comprising:

generating a set of classical control data comprising at least one classical variable by repeating a plurality of iterations, wherein each iteration comprises:
preparing a system register comprising multiple qubits in an initial quantum state;
applying a unitary operator to the system register in the initial quantum state to obtain a first evolved quantum state, wherein the unitary operator is dependent on a target quantum computation;
performing the target quantum computation on the system register in the first evolved quantum state to obtain a second evolved quantum state;
applying an inverse of the unitary operator to the system register in the second evolved quantum state and measuring each qubit in the system register to determine an output quantum state of the system register; and
after applying the inverse of the unitary operator, updating the at least one classical variable using the output quantum state of the system register unless the output quantum state indicates that the system register was not in the initial quantum state prior to measurement; and after the plurality of iterations have been completed, changing an operating parameter of the quantum computing system or adjusting a measured value based on the set of classical control data.

* * * * *